United States Patent [19]

Douhairet et al.

[11] Patent Number: 5,242,332
[45] Date of Patent: Sep. 7, 1993

[54] TRANSMISSION ARRANGEMENT WITH A COVERED TRANSMISSION BELT

[75] Inventors: Louis Douhairet, Saint-Leger-Des-Vignes; Daniel Play, Saint-Genis-Les-Ollieres; Roger Trinquard, Saint-Leger-Des-Vignes, all of France

[73] Assignee: Caoutchouc Manufacture et Plastiques S.A., Versailles, France

[21] Appl. No.: 992,257

[22] Filed: Dec. 14, 1992

Related U.S. Application Data

[62] Division of Ser. No. 678,826, Apr. 1, 1991, Pat. No. 5,171,189.

[30] Foreign Application Priority Data

Apr. 2, 1990 [FR] France ................. 90 04163

[51] Int. Cl.⁵ .............................................. F16G 5/00
[52] U.S. Cl. .................................... 474/146; 474/201; 474/246; 474/265; 474/266
[58] Field of Search ............... 474/201, 207, 242, 246, 474/144–146, 148, 265, 266, 240

[56] References Cited

U.S. PATENT DOCUMENTS

| | | |
|---|---|---|
| 3,720,113 | 3/1973 | van Doorne et al. |
| 4,303,403 | 12/1981 | Lamers ........................ 474/201 |
| 4,371,361 | 2/1983 | Giacosa ....................... 474/201 |
| 4,433,965 | 2/1984 | Hattori et al. |
| 4,610,648 | 9/1986 | Miranti, Jr. |
| 4,612,005 | 9/1986 | Miranti ......................... 474/201 |
| 5,147,253 | 9/1992 | Douhairet et al. .......... 474/242 |
| 5,152,722 | 10/1992 | Yamada ..................... 474/242 X |
| 5,171,189 | 12/1992 | Douhairet et al. .......... 474/144 |

FOREIGN PATENT DOCUMENTS

| | | |
|---|---|---|
| 0000802 | 8/1978 | European Pat. Off. |
| 0014013 | 1/1980 | European Pat. Off. |
| 0014492 | 1/1980 | European Pat. Off. |
| 0073962 | 8/1982 | European Pat. Off. |
| 0242263 | 4/1987 | European Pat. Off. |
| 0257646 | 8/1987 | European Pat. Off. |
| 0305227 | 7/1988 | European Pat. Off. |
| 0325497 | 1/1989 | European Pat. Off. |
| 2557724 | 12/1975 | Fed. Rep. of Germany |
| 605649 | 5/1926 | France |
| 1066329 | 6/1954 | France |
| 2089587 | 4/1971 | France |
| 2437531 | 11/1978 | France |
| 02527723 | 6/1982 | France |
| 2536486 | 11/1982 | France |
| 2536487 | 11/1982 | France |
| 2540953 | 2/1983 | France |
| 2625783 | 1/1988 | France |
| 61127948 | 12/1981 | Japan |
| 59-131052 | 1/1983 | Japan |
| 58-214047 | 12/1983 | Japan |
| 58-221044 | 12/1983 | Japan |
| 61-206847 | 9/1986 | Japan |

Primary Examiner—Ramon S. Britts
Assistant Examiner—Roger J. Schoeppel
Attorney, Agent, or Firm—Nils H. Ljungman and Associates

[57] ABSTRACT

A flexible transmission device for continuously variable transmissions comprises an endless flexible connecting element and a plurality of transverse links. Each link includes at least one groove into which is engaged the flexible connecting element. The links are, preferably, covered by a fabric, and the exterior surface of the fabric is for being positioned in contact with the flanges of the pulleys over which the belt is positioned and operates.

18 Claims, 6 Drawing Sheets

TRANSMISSION ARRANGEMENT WITH A COVERED TRANSMISSION BELT

This application is a division of application Ser. No. 07/678,826, filed on Apr. 1, 1991, U.S. Pat. No. 5,171,189.

BACKGROUND OF THE INVENTION

1. Field of the Invention

The present invention relates to the field of mechanical power transmission systems, which systems include a mechanism for the transmission of power between grooved pulleys wherein the transmission system includes at least one endless belt having a plurality of transverse links positioned thereon. Such systems include flexible elements, or belts, that operate by dry adherence, that is, without externally provided lubrication between the grooved pulleys. The transmission belt may include an interior V-shaped endless loop with a plurality of thrust links positioned thereon. The grooved pulleys may have fixed cheeks or flanges, or also, as is often used in variable speed transmissions, the pulleys may have movable cheeks or flanges. Both types of pulleys and/or transmissions are encountered in automotive applications and on agricultural and industrial equipment.

2. Background Information

Power transmission V-belts may be found in several families of products. The V-belts employed in such families of products may have similar external geometric shapes. Such belts were first used, and the majority of such belts are still used, for numerous industrial applications. The term "V-belt" applies, more precisely, to a composite material formed of traction cables. The cables, most often, are arranged in layers. The layers of cables form a longitudinal traction armature that may be embedded in an elastomer material. The elastomer material may be rubber or synthetic rubber. The transmission of forces by such V-belts takes place by frictional contact of the lateral, oblique surfaces of the belts with the metal walls of the conically shaped flanges of the pulleys around which the belts ar disposed.

There are two generations, or families, of such V-belts. The two families of belts differ from each other in terms of the surface of the oblique, lateral faces of the belts. The older generation of belts are surrounded by fine fabric. The fabric provides wear resistance and improves the quality of mechanical adherence between the belts and the flanges of the pulleys about which the belts are disposed. Another competing design of belts has appeared more recently. This more recent design of belts is provided for the same use as the older generation of belts. However, with the newer generation of belts, the formation of the oblique belt surfaces that contact the flanges of the pulleys is accomplished by the mechanical cutting of the belt material itself. This type of belt and pulley arrangement is termed a "raw-edge" arrangement since the surfaces of such belts are not covered by fabric.

Performance improvements over these conventional belt technologies are desirable to increase the resistance of the belts to the "wedge effect." The "wedge effect" is a phenomena wherein the transversal compression of the belts by the flanges of the pulleys causes a lateral deflection of the transverse rigidity elements of the belts. The transverse rigidity elements provide rigidity to the belts to prevent the belts from being crushed.

Patent publications, such as French Patent Publication No. 2,437,531, assigned to Varitrac AG, and European Patent Publication Nos. 0,242,263 and 0,305,227, both assigned to Hutchinson, each disclose belts with rigid transversal reinforcement elements. The reinforcement elements may be made of metal. The reinforcement elements cooperate together and also cooperate with a longitudinal traction armature. The reinforcement elements and the armature may be embedded in the elastomer base material of the belt.

These belts are generally wide V-belts that are used in mechanical devices for industrial or agricultural use. This type of belt, however, does not possess adequate performance characteristics for use in the field of automobile propulsion.

The severe demands placed on power transmissions and the desire to use such power transmissions for automobile propulsion have resulted in the production of belts whose geometry is the same as those described above, but whose operation is altogether different from those described above. Such belts are grouped, or identified, under the general category of "thrust link belts."

Numerous patent publications, in particular several assigned to Van Doorne, such as U.S. Pat. No. 3,720,113; French Patent Publication No. 2,089,587; and European Patent Publication Nos. 0,000,802; 0,014,013 and 0,014,492, disclose solid belt assemblies that are mounted on a guide element. This guide element is frequently made of metal and provides alignment to the belt assembly. However, theoretically, the guide element does not participate in the transmission of mechanical power between the pulleys to which the belts are connected. Rather, this transmission of mechanical power between pulleys is accomplished, generally, by the thrust between the adjacent, individual and aligned links that are connected to the guide element. The force transmitted through such adjacent links is then transmitted, from the links to the flanges of the pulleys, by the mechanical adherence, or friction.

The concentration of stresses in such thrust link belts can be so localized that if the belt components are constructed exclusively of metal, the operation of the belt must be conducted in a lubricated environment. This is the case even when the belt components are made of metals that have been specially treated to increase their hardness. Such thrust link belts cannot be made of currently available elastomers or plastomers due to the stresses present in the belts under operating conditions.

Nevertheless, a variant of such belts employs reinforced plastic rigid riders, or staples, that act as thrust links and operate without lubrication. Such belts are disclosed in French Patent Publication Nos. 2,536,486; and 2,527,723 and its Certificate of Continuation, French Patent Publication No. 2,536,487, all of which are assigned to Michelin. Additional variants of the belts described above are also disclosed in French Patent Publication No. 2,625,783, assigned to Caoutchouc Manufacture Et Plastiques. All of the links, or riders, disclosed in these publications are supported by flat, composite belts. However, the links, or riders, are likely to move on such composite belts due to rocking and relative slip.

The improvement of contact between the two types of independent solid materials that form the links, or riders, and the belts has been the object of numerous refinements in belt technology. Such refinements are disclosed in West German Patent Publication No. 2,557,724, assigned to Heynau; French Patent Publication No. 2,540,953, assigned to Regie Nationale Des Usines Renault et Compagnie Des Produits Industriels De L'Ouest; European Patent Publication No. 0,073,962, assigned to Nissan Motor Company, Limited; U.S. Pat. No. 4,433,965 to Hattori, assigned to Nippondenso, Co. Ltd.; and U.S. Pat. No. 4,610,648 to Miranti, assigned to Dayco Corporation. All of these publications relate to flat belts, or thin straps, that are equipped with rigid links, or riders. The rigid links, or riders are made of plastic and reinforced with fibers. The mechanical power transfer capabilities of the belts disclosed in these publications are, nevertheless, limited.

The prior art does not disclose a transmission belt that operates by dry, mechanical adherence and which is also capable of mechanically transferring the very high power levels required for automobile propulsion and for agricultural and industrial machines. Also, the prior art does not disclose a belt having a significantly long service life due to the capability of the belt to distribute stresses over all of the components of the belt.

OBJECTS OF THE INVENTION

One object of the present invention is to provide a mechanical power transmission belt that solves the problems of the prior art and is an improvement over known V-belts. Such a belt should be reliable and capable of transmitting high powers without the need for lubrication. The power transmission belt of the present invention combines some of the advantageous properties of several belts of various known families of V-belts. Another object of the present invention is to provide such a mechanical power transmission belt that does not belong exclusively to any one category or family of belts, even though the belt of the present invention combines the advantageous properties of several individual families of belts.

SUMMARY OF THE INVENTION

The present invention provides a thrust link type mechanical power transmission belt having a loop. The loop may be a textile traction armature of a V-belt. Such a V-belt having a textile traction armature is, preferably, of "raw-edge" type construction.

The belt of the present invention includes rigid links, or rigid riders, that are positioned astride the loop. The links act as thrust links for mechanical power transmission.

The links, or thrust links, are guided on their inside surfaces by the oblique walls of the loop. The exterior surfaces of the thrust links do not directly contact the flanges of the pulleys over which the belt rides. Rather, the thrust links are covered with an elastic, or resilient fabric. The fabric, in turn, is coated with an elastomer that provides the mechanical connection between the thrust links and the pulleys. Moreover, the fabric is deformable from link to link but still provides the final mechanical adherence between the belt and the flanges of the pulleys.

A resistance to transverse compression is provided by the rigid riders, or thrust links, of the belt of the present invention. The links are not adherized by an elastomer to the loop, or textile traction armature. Therefore, the stresses applied to the transmission belt are more evenly distributed over all of the components of the transmission belt. Thus, the advantageous characteristics of the transmission belt of the present invention may be utilized at a higher level of efficiency than was previously possible. The transmission belt of the present invention provides a level of efficiency and performance that combines the capabilities and advantages of a conventional V-belt with the capabilities and advantages of a conventional thrust link belt. Also the transmission belt of the present invention is capable of operating without the need for external lubrication.

The present invention, therefore, provides a flexible, mechanical, power transmission belt or link, that may be used in conjunction with a fixed ratio or variable ratio grooved pulley system. The transmission belt of the present invention is capable of operating by dry adherence to the pulleys to which it is connected. The transmission belt of the present invention includes a loop that is flexible and quasi-inelastic. Also, the transmission belt of the present invention includes transversely rigid thrust links that are mounted on the loop.

One characteristic of the transmission belt of the present invention is that the loop of the belt may be formed by a V-belt. The V-belt has oblique walls, which oblique walls contact the interior surfaces of the thrust links. The thrust links are constructed in the form of links and are positioned astride the loop. Another characteristic of the transmission belt of the present invention is that the rigid links, or thrust links, are enveloped by a surrounding fabric. The fabric, in turn, defines an exterior surface which exterior surface contacts the flanges of the transmission pulleys to which the belts are connected.

In summary, one feature of the invention resides broadly in a transmission having: a drive pulley; a driven pulley; each of the drive pulley and the driven pulley having conical surfaces; a transmission mechanism extending around each of the drive pulley and the driven pulley; the transmission mechanism extending around each of the drive pulley and the driven pulley; the transmission mechanism including a plurality of links mounted on the endless flexible connecting element; each of the links including at least one groove means for receipt of the endless flexible connecting element therein; a flexible cover at least substantially surrounding the transmission mechanism; and the flexible cover extending generally continuously along generally the entire length of the transmission mechanism.

A further feature of the invention resides broadly in a transmission belt for a transmission, the transmission having a drive pulley and a driven pulley, the transmission belt for extending movably around the drive pulley and the driven pulley, the drive pulley for driving the driven pulley by the transmission belt, the belt comprising: a flexible loop of material; the flexible loop having a substantially trapezoidal cross section; a plurality of substantially rigid links mounted on the flexible loop; the links each defining a cavity for receiving a portion of the flexible loop, the cavity being configured to correspond substantially to a portion of the flexible loop cross section; the links each having an exterior perimeter surface defining an at least partially trapezoidal cross section; each the link having opposed contact surfaces connected to the exterior perimeter surface; each the link contact surface for being in removable contact with an adjacent the contact surface of an adjacent the link; each the link contact surface being configured to push the adjacent contact surface of the adjacent link to move the belt along the path of travel; a flexible cover substantially surrounding the exterior perimeter surface of each the link; and the flexible cover extending generally continuously along generally the entire length of the belt.

BRIEF DESCRIPTION OF THE DRAWINGS

The present invention may be understood with reference to the accompanying drawings, in which;

FIG. 5b is a front elevational view, partially in section, of an embodiment of the transmission belt of the present invention that employs the closable link shown in FIG. 5a;

DESCRIPTION OF THE PREFERRED EMBODIMENTS

Figure 1:
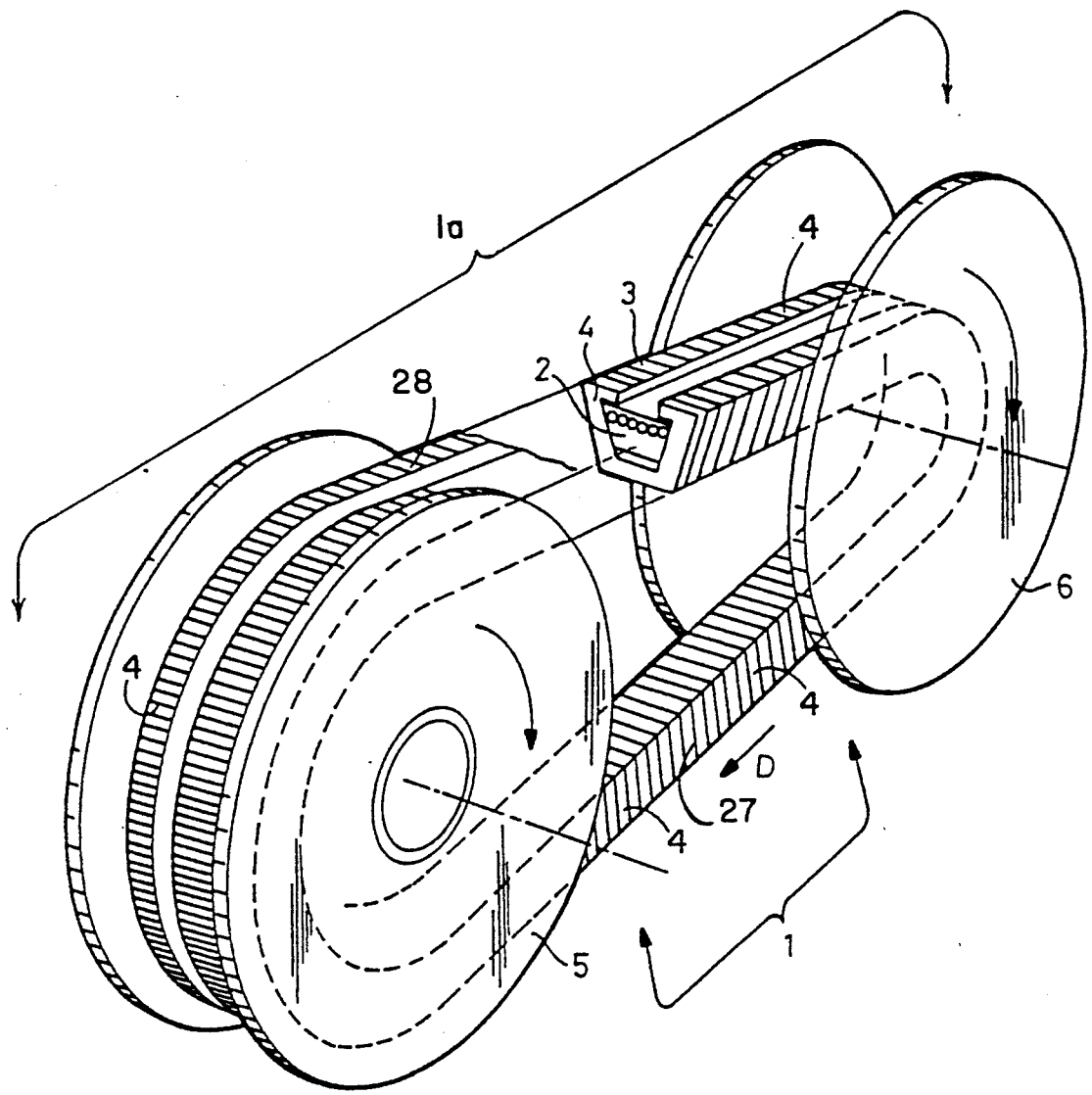
FIG. 1 is a perspective view showing the flexible transmission belt of the present invention mechanically connected between two pulleys of a mechanical transmission wherein the flexible transmission belt and transmission operate by dry mechanical adherence.

FIG. 1 shows power transmission system la, which includes mechanical power transmission belt 1. Transmission belt 1 is employed as a flexible mechanical power transmission belt. Transmission belt 1 includes loop 2 which is an endless loop. Transmission belt 1 is, preferably, at least partially concealed by covering fabric 3. Loop 2 is partially enclosed by rigid links, or stirrups, 4. In other words, a plurality of links 4 are positioned upon and at least partially surround loop 2. The disclosed stacking or positioning, of links 4 on loop 2 permits transmission belt 1 to transmit power from drive pulley 6 to receiver pulley 5, essentially, by the reciprocal thrust of the links 4. In other words, drive pulley 6 supplies mechanical power to the links 4 that are in immediate contact, through fabric 3, with drive pulley 6. Those links 4 that are in immediate contact with drive pulley 6, through fabric 3, transfer the mechanical power through the stack of links 4 in the direction of arrow D. Transfer of mechanical power through the stack of links 4 occurs by reciprocal, physical contact between parallel surfaces 7 (shown in FIG. 2) of adjacent links 4. In other words, the links 4 in immediate contact with drive pulley 6 transfer power by applying a force on the first adjacent link 4 positioned along, generally, straight belt portion 27. That first link 4, in turn, pushes on the next adjacent link 4 in the direction of arrow D. Such reciprocal pushing of adjacent links 4 in the direction of arrow D is generally continuous along the entire extent of belt portion 27. The stack of rigid links 4 along belt portion 27, in turn, transfers the mechanical power therein to the links 4 that are in immediate contact, through fabric 3, with receiver pulley 5. Those links 4 in immediate contact through fabric 3, with receiver pulley 5 then transfer the mechanical power to receiver pulley 5.

With such mechanical power transmission occurring through links 4, loop 2 is used exclusively for the guidance and support of links 4, even though loop 2 is held tightly between pulleys 5 and 6.

On the other hand, if a conventional V-belt were to be used in place of transmission belt 1, such a conventional V-belt would transfer mechanical power by exerting a force from drive pulley 6 to receiver pulley 5 by a tension differential between a driving portion of the conventional V-belt and by a slack portion of the conventional V-belt. With such a conventional V-belt, the driving portion of the conventional V-belt would be under high tension and the slack portion of the conventional V-belt would be under low tension. If such a conventional V-belt were employed in lieu of transmission belt 1 of the present invention, the slack portion of the conventional V-belt would correspond to belt portion 27 and the driving portion of the conventional V-belt would correspond to, generally, straight belt portion 28. Transmission belt 1 may function somewhat as the equivalent of a combination of these two types of operations. In other words, transmission belt 1 may exhibit properties similar to a combination, or hybrid, of the high and low tension functions of the above described conventional V-belt.

Receiver pulley 5 and drive pulley 6 may be a part of a variable ratio transmission system. With such a variable ratio transmission system, one flange of at least one of drive pulley 6 and receiver pulley 5 is axially displaceable relative to the other flange of the same pulley. The specific means for accomplishing such axial displacement is well known to those of ordinary skill in the art. Such variable ratio systems may employ known drive and/or receiver pulleys that have conical belt engagement surfaces that provide a variety of diameters of the pulley over which the belt travels. It is possible to achieve an increase in operational performance of both fixed-ratio and variable-ratio transmission systems by employing a flexible belt, such as transmission belt 1 according to the present invention. Fixed ratio transmission systems, typically, employ grooved pulleys having a constant width. In other words, in fixed-ratio systems, the separation between the flanges of the pulleys is constant since the flanges of each pulley are not relatively axially displacable. Also, such fixed-ratio systems may, possibly, not employ conical belt engagement surfaces.

Figure 2:
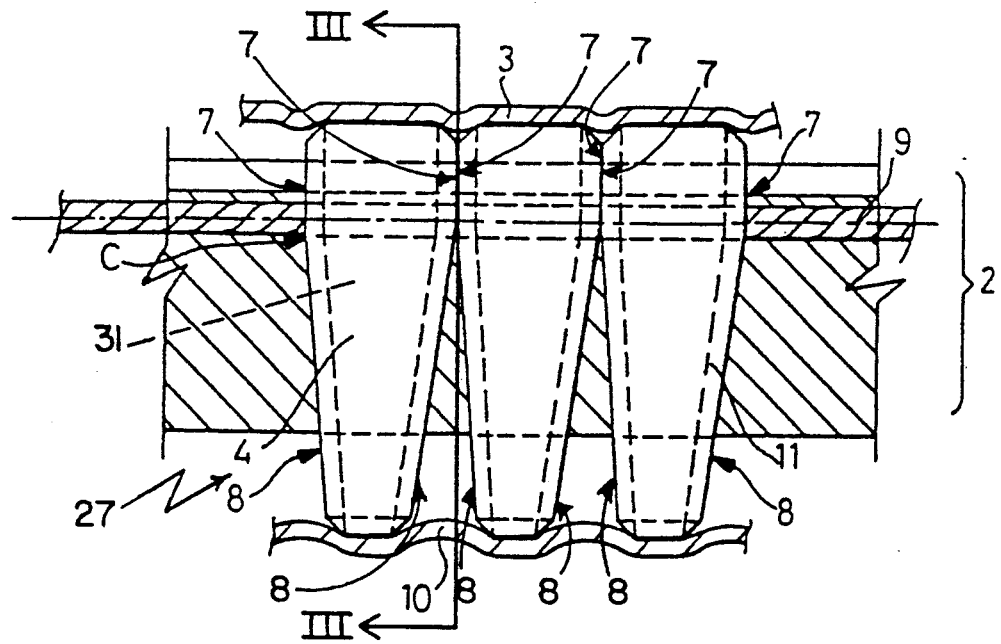
FIG. 2 is an inverted side elevational view, partially in section, showing several links of the transmission belt of the present invention wherein the links are aligned on a portion of the loop.

FIG. 2 shows several links 4 positioned astride loop 2. In FIG. 2, links 4 are shown positioned laterally along the straight line trajectory of belt portion 27. Thus, the fragment of belt portion 27 depicted in FIG. 2 is shown inverted from the orientation of belt portion 27 as shown in FIG. 1. The power transmission from drive pulley 6 to receiver pulley 5 is achieved, for the most part, by the reciprocal thrust, or contact, between adjacent pairs of links 4 at adjacent parallel surfaces 7.

Oblique surfaces 8 are, generally, symmetrically defined by each link 4. The relative configuration of adjacent oblique surfaces 8, of adjacent links 4, facilitates the winding of transmission belt 1 around pulleys 5 and 6 since adjacent oblique surfaces 8 pivot toward one another when their associated links 4 are wound around pulleys 5 and 6. However, when adjacent links 4 assume a straight line trajectory, such as those rigid links 4 positioned along belt portions 27 and 28, their respective oblique surfaces 8 are pivoted away from one another to the relative configuration as shown in FIG. 2.

In another embodiment of the present invention (not shown), only one oblique surface 8 is provided for each link 4. The other surface of such link 4 then has one continuous and, generally, straight surface 7 extending from generally the top to the bottom of such rigid link 4.

As portions of transmission belt 1 move from a straight line trajectory, such as along belt portions 27 and 28, to a curved trajectory, such as when wound around one of pulleys 5 and 6, a displacement of thrust may occur in the vicinity of contact zone C between two adjacent links 4. Links 4 may be made of reinforced, high-modulus polymer materials or may be made of metal.

An important feature of the present invention is the construction of loop 2. Loop 2 may define a V-belt 31. The term "V-belt" refers to a belt that may be in the shape of a "V" or a trapezoid or truncated "V". V-belt 31 may be of conventional, composite structure. Loop 2 may also include traction layer 9. Traction layer 9 may be formed of cables and/or high-modulus twisted textile fibers. In one preferred embodiment of the present invention, traction layer 9 is formed of aramid fibers. The aramid fibers of traction layer 9 may be treated so that they are intimately bonded to elastomer compound base 13 (see FIG. 3) of V-belt 31.

Surrounding, or covering, fabric 3 is shown positioned partially on the stack of links 4 in FIG. 2. The use of fabric 3 in the present invention may necessitate the employment of bevels 11 on generally each of the peripheral surfaces of links 4. Bevels 11 allow for the deformability of fabric 3 in the vicinity of zone 10 during passage of links 4 from a curved trajectory, when wound on one of pulleys 5 and 6, to a straight line trajectory, such as along belt portions 27 and 28. Adjacent links 4 pivot on one another in the vicinity of contact zone C as the adjacent links 4 move between straight and curved trajectories. As a pair of adjacent links 4 move from a straight trajectory to a curved trajectory, adjacent parallel surfaces 7 pivot away from one another and adjacent oblique surfaces 8 pivot toward one another. On the other hand, as adjacent links 4 move from a curved trajectory to a straight trajectory, adjacent parallel surfaces 7 pivot toward and into contact with one another and adjacent oblique surfaces 8 pivot away from one another.

To facilitate such relative movement between adjacent links 4, fabric 3, which consists of an elastic fabric coated with an elastomer compound, is slackened longitudinally in the vicinity of zone 10. Fabric 3, is also in contact with the front surface of link 4. The portions of fabric 3 in contact with bevels 11 are able to conform, generally, to the outer contour of bevels 11 due to the simultaneous adherization and vulcanization of the elastomer compound used to impregnate, or coat, the elastic fabric that forms fabric 3.

Fabric 3, may advantageously be oriented obliquely relative to composite V-belt 31. Also, fabric 3 may be formed in a single thickness or in multiple thicknesses.

Figure 3:
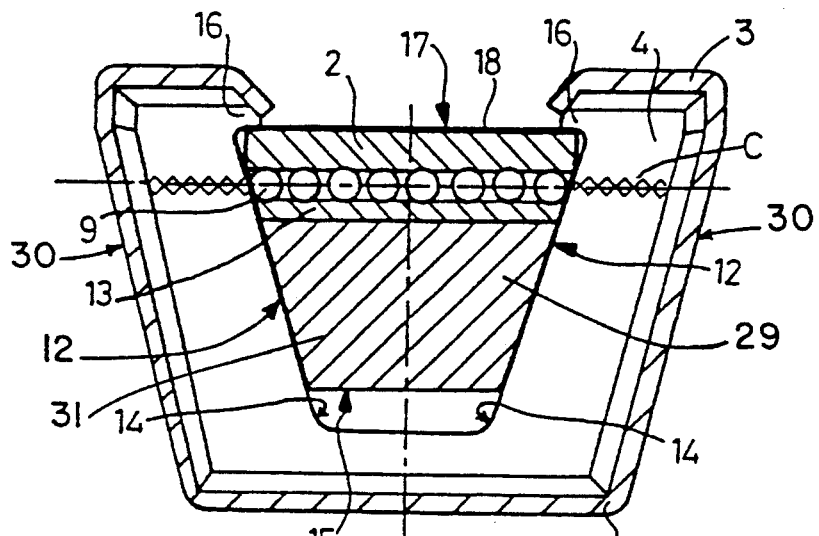
FIG. 3 is a front elevational view, partially in section, of the transmission belt of the present invention, taken along line III—III of FIG. 2.

Loop 2 may define a covered V-belt 31. However, as shown in FIG. 3, loop 2 defines a V-belt 31 having raw edges. When V-belt 31 has such raw-edges, oblique walls 12 are formed by cutting a cylindrical sleeve of the material used to form V-belt 31. The cut cylindrical sleeve may then be positioned adjacent and attached to a very long traction layer 9. Traction layer 9 may be embedded in elastomer compound base 13.

Traction layer 9 may consist of a cord, twisted aramid fibers or another high-modulus textile material that is preferable chemically treated to achieve an intimate bonding with elastomer compound base 13. Interior surface 14, of link 4, are positioned, substantially, in contact with oblique walls 12 of loop 2 as shown in FIG. 3.

Loop 2 may be reinforced in trapezoidal-shaped zone 29 between traction layer 9 and small base 15. Such reinforcement may be either by textile plys or by short fibers. Such reinforcement is provided to resist the compression of the belt due to the "wedge effect." Such a "wedge effect" may occur due to forces applied on oblique walls 12 by interior surfaces 14. Such a "wedge effect" ay occur to the links 4 that are wound on a pulley 5 or 6. The reinforced portion of loop 2 may be longitudinally elastic, or resilient. When transmission belt 1 is wound around a pulley, the reinforced portion of zone 29 is somewhat flattened against interior surfaces 14 of links 4. Since links 4 include angled, or beveled, interior surfaces 14, as shown in FIG. 3, portions of interior surfaces 14 may participate in the volumetric compression of the portion of loop 2 located between the neutral fiber at the level of, or near, traction layer 9 and small base 15.

Stresses that are signficantly higher than those encountered during the current usage of conventional V-belts can be exerted by the rigid, interior surfaces 14 of links 4 along the curved trajectory of belt portions around the pulleys 5 and 6. Interior surfaces 14 of links 4, preferably, do not separate from oblique walls 12 when links 4 move in their straight line trajectory along belt portions 27 and 28. Rather, interior surfaces 14 remain in contact with oblique walls 12, without applying any stress to loop 2 during such straight line trajectory movement.

However, those portions of loop 2 that are wound on a pulley encounter pressures or forces that are of the same order of magnitude as those applied on the sides 30 of the links. Such pressures or forces may be due to the compression of loop 2, such as may be due to the "wedge effect", as described above. Such pressures are exerted in a similar manner as those applied to conventional V-belts. Such pressures or forces, are exerted through sides 30 of links 4 due to force applied to links 4 by contact with the flanges of the pulleys.

The risks of alternating stresses are significantly reduced with the present invention due to the utilization of a loop 2 that is in the form of V-belt 31. The employment of such a V-belt 31 permits the mechanical powers transmitted by transmission belt 1 to be much higher than those transmitted with a standard V-belt, as explained in greater detail below.

Links 4 remain stacked and under compression at parallel surfaces 7 in the vicinity of contact zone C along belt portion 27. However, belt portion 28 is somewhat slack. Under such circumstances, adjacent links 4 of belt portion 28 may not necessarily be in contact with one another. Therefore, links 4 of belt portion 28 may become separated from loop 2 and may even become totally disengaged from loop 2 due to the effects of gravity.

To eliminate the risk of separation of links 4 from loop 2, lateral staples 16 are fitted on links 4. These staples 16 partially enclose large base 17 of loop 2 to secure links 4 to loop 2. Links 4 are assembled with loop 2 by, preferably, forcing links 4 over the naturally elastic or resilient loop 2 which loop 2 is not reinforced above the neutral fiber between traction layer 9 and large base 17.

As portions of belt 1 move between the curved trajectory and the straight line trajectory, the part of loop 2 between traction layer 9 and large base 17 is subjected to an elastic, or resilient, variation of length. However, links 4 do not, similarly, exhibit such a variation in length in the vicinity of lateral staples 16. Therefore, longitudinal micro-slippage can occur between loop 2 and lateral staples 16. Because of the possible slippage, it is advantageous to provide large base 17 with coating 18. Coating 18, preferably, has a low coefficient of friction. Such a coating 18 may be, for example, a thin film of very high molecular weight polyethylene or ethylene polytetrafluoride. Thus, the coefficient of friction between large base 17 and lateral staples 16 is low.

Fabric 3 may cover all, or only a portion, of the exterior surfaces of links 4. Fabric 3 may be fixed to sides 30 of links 4 by a thermal treatment subsequent to assembly of transmission belt 1. Depending on the application that transmission belt 1 is to be used for, the continuity of fabric 3 can be interrupted adjacent to each lateral staple 16 as shown in FIG. 3, or continued to thereby cover large base 17. However, fabric 3 may, possibly, not adhere to large base 17 because coating 18 has a low coefficient of friction.

Figure 4:
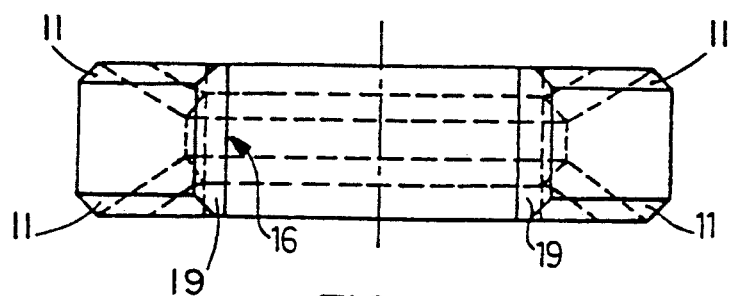
FIG. 4 is a top view of an individual link of the present invention.

FIG. 4 is a top view of one link 4. FIG. 4 shows the presence of bevels 11 on the extremities of link 4. The purpose of bevels 11 is to allow deformability of fabric 3. Upper portions 19 of bevels 11 also cover the area in the vicinity of lateral staples 16. Upper portions 19 help to keep the interrupted edge of fabric 3 affixed to the links 4, particularly when centrifugal force is exerted as transmission belt 1 winds around pulleys 5 and 6. For applications at relatively low speeds, fabric 3 can be closed over itself by mutually engaged, overlapping portions. The mutual fastening of the overlapping portions may occur in the vicinity of coating 18 of large base 17. Since fabric 3 may not be intimately bonded to coating 18, micro-displacements between fabric 3 and links 4 may occur.

Figure 5A:
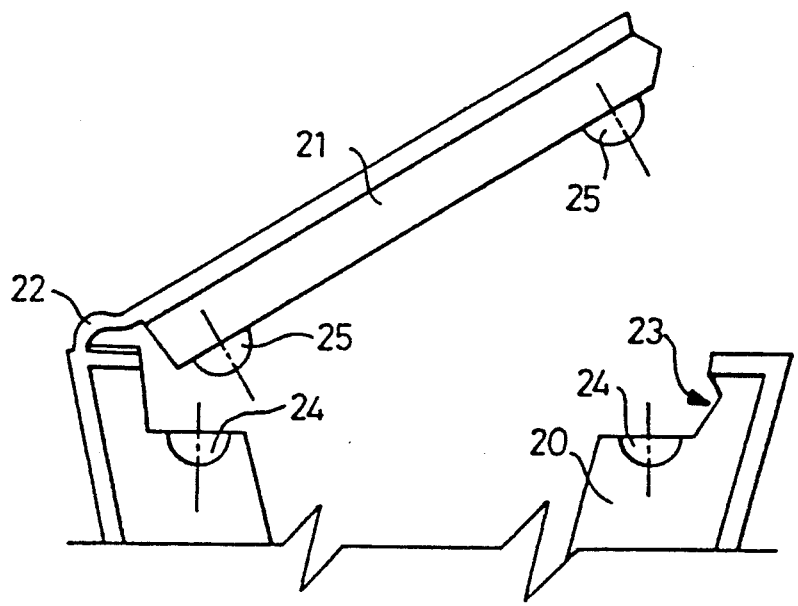
FIG. 5a is a fragmentary front elevational view of a closable link of the present invention.
Figure 5B:
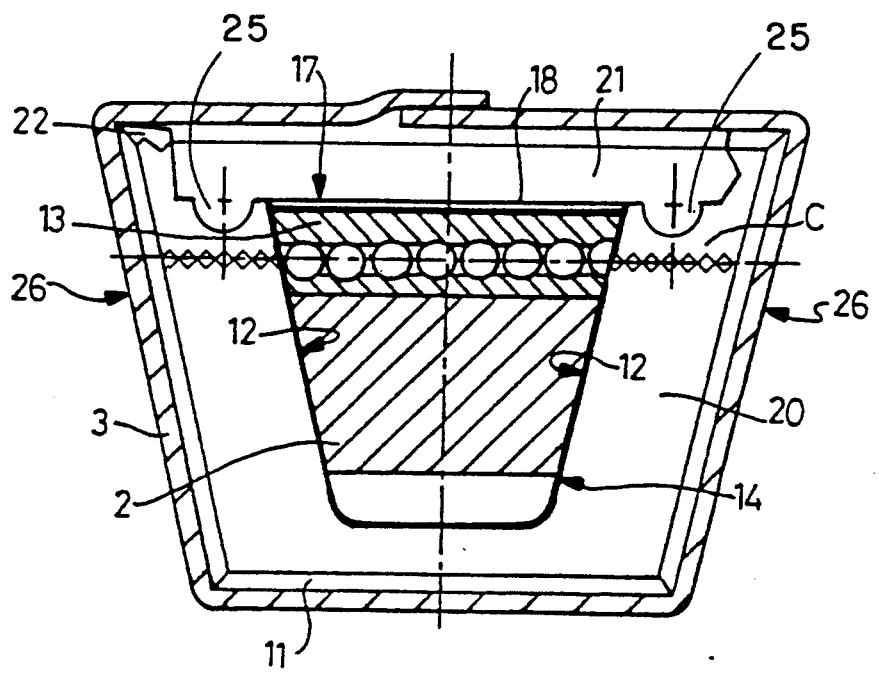

FIGS. 5a and 5b show another embodiment of link 4 of the present invention. In this embodiment, closable, or closed, link 20 includes strap 21. Strap 21, when closed, causes closable link 20 to generally surround an entire cross section of loop 2. This embodiment of the present invention minimizes the risks of fatigue due to the alternating stresses that may be localized in the beveled, or angled, portions of links 4. Such alternating stresses may occur at points in the non-closable links 4 which are open in a "U" shape, shown in FIGS. 1–4 and described above, where the thickness is reduced.

FIG. 5a is a partial view of closable link 20 in the open position. FIG. 5b shows closable link 20 in the closed position. As shown in FIG. 5b, strap 21 is positioned adjacent loop 2 when strap 21 is in the closed position. Closable link 20 and strap 21 are connected together in an articulated manner by hinge 22 Hinge 22 is produced during the molding of closable link 20.

A system for assembling the components of transmission belt 1 should, preferably, be capable of being automated to achieve a high rate of production of transmission belts 1 that employ closable link 20. In such automated systems, strap 21 is closed by an appropriate guide element after the associated closable link 20 is installed astride loop 2. Edge 23, that may be temporarily clipped, is provided to hold the end of strap 21 therein when strap 21 is in the closed position as shown in FIG. 5b. Such a closing of strap 21 is provided by the engagement of corresponding lugs 25, of strap 21 in matching cavities 24.

Three arrangements of lugs 25 and cavities 24 are possible. In one arrangement, all of cavities 24 are formed in the body of closable, or closed, link 20, and all of matching lugs 25 are positioned on strap 21. In another arrangement, all of cavities 24 are formed in strap 21 and all of matching lugs 25 are positioned on the body of closable link 20. In a third arrangement, at least one each of cavities 24 and matching lugs 25 are on the body of closable link 20 and at least one each of cavities 24 and matching lugs 25 are on strap 21.

A continuous heat-sealing process using e.g. ultrasound, or an adhesive fastening process using e.g. cyanoacrylate adhesive, or any similar assembly process may be used to finally close straps 21 over loop 2.

Closable link 20, as shown in FIG. 5b, is configured to resist alternating fatigue. Such resistance to alternating fatigue is desirable since closable link 20 may receive, possibly, high compression stresses on interior surfaces 14 and oblique walls 12.

During assembly, the number of links 4 or closed links 20 is selected, for a given length of transmission belt 1, to provide a belt that may have some play after the belt is installed between two pulleys. Such play may be absorbed, or compensated for, during the passage of transmission belt 1 between the lowest winding radii on the pulleys and the portion of belt travel along the two straight line trajectories. Because of the rocking of adjacent links in the vicinity of contact Zones C, the number of links 4 or closable links 20 required to construct a transmission belt 1 for a given power transmission 1a (see FIG. 1), is greater than the number of links 4 required to construct a transmission belt 1 of a length that would be required when power transmission 1a is of a circular configuration.

Also, allowance for play in belt 1 must be made and balanced during the installation of fabric 3 over links 4 or 20. To encourage the micro-displacements that occur between loop 2 and straps 21, large base 17 of loop 2 is, preferably, provided with coating 18. The coefficient of friction between loop 2 and straps 21 is, generally, lowered because of coating 18.

Closable links 20 are, preferably, covered with fabric 3 to improve the friction of exterior oblique surfaces 26 against the flanges of pulleys 5 and 6. Fabric 3 is, preferably, glued only to exterior oblique surfaces 26. The presence of fabric 3 is not essential on the top and bottom bases of the trapezoid-shaped closable link 20. However, the elasticity of fabric 3, contributes to balancing the play between adjacent links 20. Such elasticity may occur due to a partial bonding by adhesive to closable link 20 along bevels 11. Bevels 11 run along each of the corners of closable link 20.

The inclusion of fabric 3 on closable link 20, also, may provide a certain amount of vibration damping during reciprocal rocking of adjacent closable links 20 in the vicinity of contact zone C. Fabric 3 can be closed and made to adhere to itself through the reciprocal engagement of overlapping portions of adjacent strap 21, as shown in FIG. 5b.

A preferred process for the fabrication of transmission belt of the present invention includes two heat cycles for each component. Links 4 or closable links 20 are, initially, fabricated by molding. Such molding may be performed by injection molding techniques. When using such injection molding techniques, a closed mold having a large number of impressions may be employed. The material used for molding links 4 or 20 may, for example, include semi-aromatic polyamide that is, preferably, reinforced with short fibers. The number of the molded impressions can be on the order of two hundred to three hundred links for a flexible transmission belt 1 having a developed length of about one meter.

The formation of loop 2 employs procedures that may be known. Such procedures may be those used for the formation of conventional covered V-belts or raw-edged V-belts.

In a variant that utilizes a "reversal", or "turning inside out" technique, a cylindrical sleeve of appropriate length is fabricated in a succession of layers. The first layer includes coating 18, having a low coefficient of friction. Such coating 18 may be made from a very high molecular weight polyethylene film or possibly ethylene polytetrafluoride. Elastomer compound base 13 may be located above and/or below traction layer 9. The formation of traction layer 9 may be performed, for example, by using twisted aromatic polyamide fibers that have, preferably, been treated to ensure adherence with elastomer compound 13. The layers may be reinforced by fabric or by short fibers before being arranged to form loop 2. At this stage, loop 2 may be in the form of a cylindrical sleeve. Such a loop 2 is resistant to transversal compression. The elastomer compound base 13 and traction layer 9 thus formed is then vulcanized by pressurized heat treatment around an internal core. This process gives a smooth surface to coating 18. Finally, the sleeve is cut into individual loops 2 that are then "turned inside out."

The assembly of links 4 and/or 20 on loop 2 is, necessarily, a mechanized operation because of the high number of components employed to make a single transmission belt 1. Lateral staples 16 of links 4 and/or 20 are forced over large base area 17 and traction layer 9 of loop 2.

In the embodiment of the present invention that employs closable links 20, straps 21 are folded after assembly. The closing of straps 21 is made possible by the flexing of hinge 22. Heat sealing or adhesive fastening of matching lugs 25 in cavities 24 may be performed by a continuous process, thereby making the assembly permanent.

Irrespective of whether links 4 or links 20 are employed, the above formed assembly is covered by fabric 3 after the prior deposition of a layer of adhesive on the surfaces to which fabric 3 is to be joined, if such adhesive is deemed to be necessary. The edges of fabric 3 are either partly folded back, or are overlapped to ensure closing. This complete assembly of the flexible transmission belt is then enclosed in a mold to press fabric 3 in contact with the external surfaces of links 4 and 20 and bevels 11. An appropriate heat treatment ensures bonding of fabric 3 to links 4 and/or 20, without damage to the previously vulcanized materials that form loop 2.

The composite transmission belt 1 that forms a flexible transmission belt according to the present invention can be used in the same manner as a conventional V-belt or as a wide belt for a mechanical power transmission. Transmission belt, 1 of the present invention has the following advantages over the transmission belts of the prior art:

1. The performance of transmission belt 1 may be considered as a combination of the capabilities of thrust link transmissions that operate without lubrication and the capabilities of conventional V-belts;
2. The reciprocal contact between the oblique walls of the links and the loop helps to ensure the centering and alignment of the links.
3. The relative slip of the components experienced in thrust link transmissions is minimized by the mechanical adherence of the links against the deformable oblique walls of the loop;
4. The resulting flexible belt combines the mechanical adherence of conventional V-belts with the transversal incompressibility of flexible elements with rigid links;
5. The presence of the cover fabric, which is used for the mechanical adherence of the links against the flanges of the pulleys, forms an elastic connection between the links, thereby reducing the risk of vibration at annoying acoustical frequencies;
6. The separation, due to alternating fatigue, of the components of the loop is minimized by an improved distribution of stresses over a surface that remains in permanent contact with the link; and
7. The mass production of several sizes of links makes it possible to manufacture flexible elements in any desired original belt length, thereby making the production of such transmission belts, or elements, particularly economical.

Without going beyond the context of the invention, a technician skilled in the art can combine all shape and size variations to ensure an efficient transmission by flexible elements between two or more grooved pulleys.

Figure 6A:
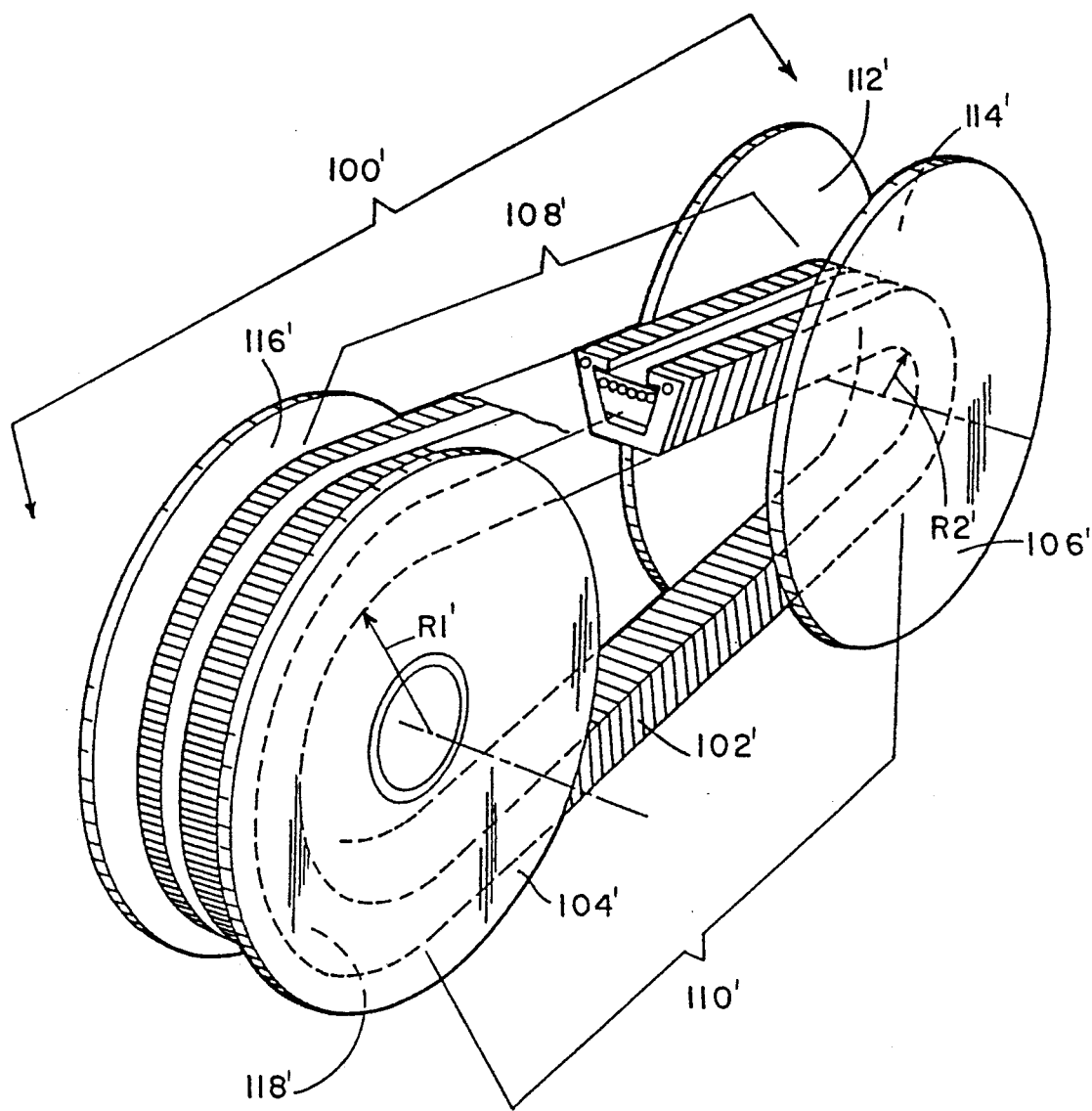
FIG. 6A is a perspective view showing a transmission system that operates by dry mechanical adherence and employs a transmission belt of the present invention.

As further explanation, FIG. 6A shows power transmission system 100'. Transmission system 100' includes belt 102'. Belt 102' is positioned on, and travels between, pulleys 104' and 106'. One of pulleys 104' and 106' may be a drive pulley while the other of pulleys 104' and 106' may be a receiver pulley.

Figure 6B:
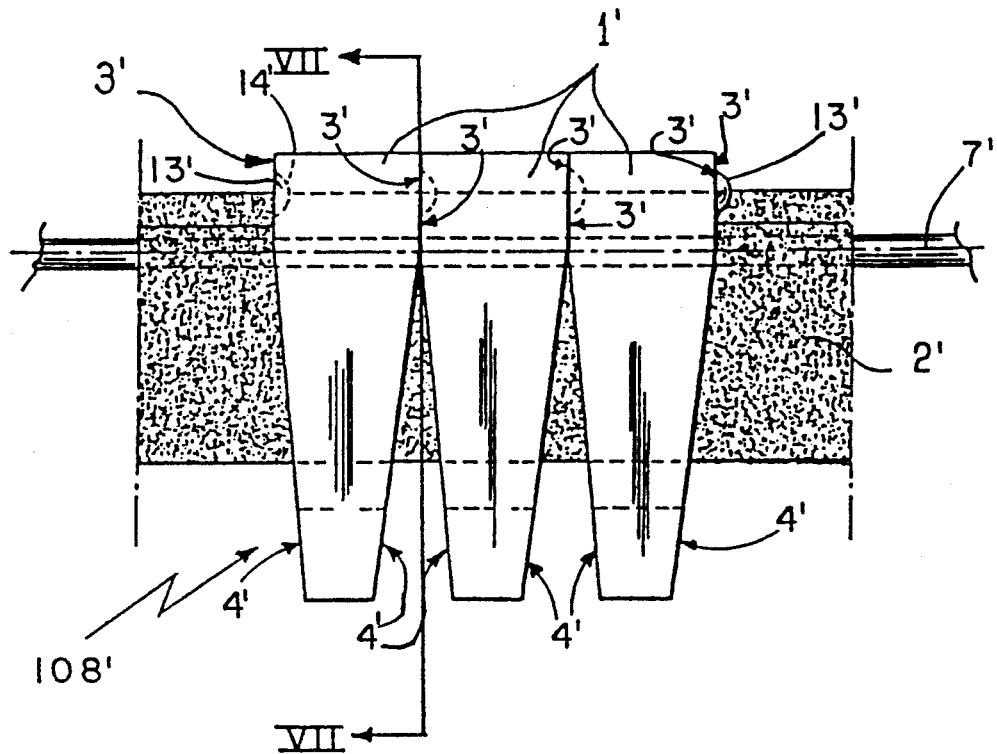
FIG. 6B is a side elevational view, partially in section, showing several links of the transmission belt of the present invention wherein the links are positioned on a portion of a loop.

FIG. 6B shows an assembly of several transversally rigid links, or stirrups, 1'. Links 1' are assembled in alignment on loop 2'. The portion of belt 102' shown in FIG. 6B corresponds to a portion of straight line trajectory portion 108' of transmission element 102' (See FIG. 6A). The transmission ratio of transmission system 100' can be varied by changing radius R1' and/or R2' of pulleys 104' and/or 106', respectively, as is well known in the art.

The majority of the power transmissive by belt 102' is accomplished by the reciprocal contact between parallel surfaces 3' of adjacent links 1'. Oblique surfaces 4' of links 1' are generally symmetrically defined by links 1', as shown in FIG. 6B.

The relative configuration of adjacent oblique surfaces 4' of adjacent links 1' facilitates the winding of belt 102' around pulleys 104' and 106' since adjacent oblique surfaces 4' of adjacent links 1' are out of contact with one another along straight line trajectory portions 108' and 110'. However, such adjacent oblique surfaces 4' pivot toward and may at least partially contact one another when their associated links 1' exit straight line trajectory portions 108' and 110' and wind around pulleys 104' and 106'. Also, adjacent parallel surfaces 3' pivot away from one another when their associated links 1' exit straight line trajectory portions 108' and 110' and wind around pulleys 104' and 106'.

However, when adjacent links 1' assume a straight line trajectory along straight line trajectory portions 108' and 110', their respective oblique surfaces 4' are pivoted away from one another to the relative configuration shown in FIG. 6B.

A gradual surface configuration transition exists at the junction of parallel surfaces 3' and oblique surfaces 4' of each link 1'. Link 1' may be made of a high-modulus polymer material.

Figure 7:
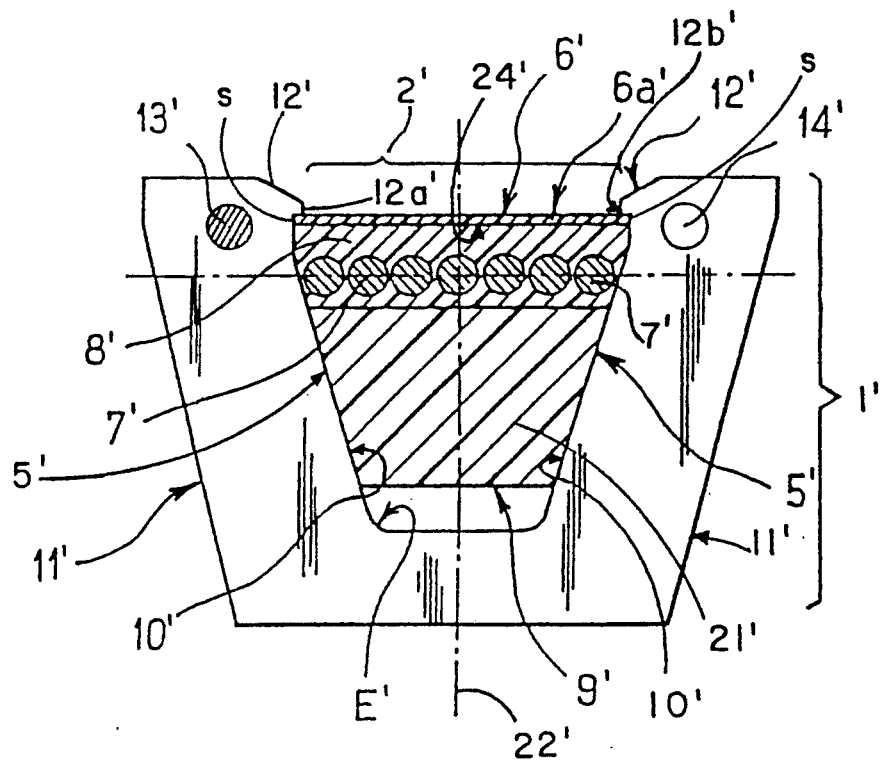
FIG. 7 is a front elevational view of the transmission belt of the present invention, taken along line VII—VII of FIG. 6B.

FIG. 7 shows loop 2' which defines interior V-belt 21'. V-belt 21' may have a trapezoidal cross-sectional configuration. Loop 2' defines oblique walls 5'. Oblique walls 5' may either be "bare" (known commonly as a "raw-edge" type of belt) or oblique walls 5' may be covered by a fabric (known commonly as a "covered" type of belt). Oblique walls 5' are configured and positioned to be in contact with interior walls 10' of links 1'. Exterior surface 6' of link 1' defines a large base area of loop 2'.

Reinforcement elements 7' are positioned within elastomer compound base 8'. Reinforcement elements 7' are, frequently, constructed of a high-modulus textile material. Reinforcement elements 7' are intimately bonded to elastomer compound base 8' by physicochemical or physio-chemical means. Reinforcement elements 7' are, also, bonded to elements that are resistant to transverse compression and which extend to small base 9' of V-belt 21'. Reinforcement elements 7' may comprises a neutral fiber of V-belt 21'.

The oblique walls 5', of each link 1', that are wound around pulleys 104' and 106', are in contact with their respective surfaces 10' of each respective link 1'. Also, when links 1' are being wound around pulleys 104' and 106', exterior oblique surface 11' are in direct contact with the respective flanges of pulleys 104' and 106'. The angle that exterior oblique surfaces 11' form relative to line 22' is not necessarily the same as the angle that interior surfaces 10' form relative, also, to line 22'.

Links 1' include lateral staples, or flanges, 12'. Staples 12' are positioned on either side of and in contact with exterior surface 6' of loop 2'. The separation between edges 12a' and 12b' along surface 6' is selected based on the elasticity of the particular V-belt 21' over which the particular staple 12' will be positioned. Such separation is selected such that each link 1' can be forcibly engaged over V-belt 21' during assembly of link 1' onto loop 2'.

After assembly of belt 102', the very small surfaces, of lateral staple 12' that contact exterior surface 6' prevent link 1' from falling out of engagement with V-belt 21'. Such disengagement of link 1' from V-belt 21' is prevented even when link 1' is positioned and moving along straight line trajectory portions 108' and 110'. Moreover, such disengagement of link 1' from V-belt 21' is prevented even when a portion of belt 102' is slack. Belt 102' is considered "slack" when adjacent links 1' are not in contact with one another. Experience has shown that it is preferable to have coating $6a'$ on exterior surface 6'. Coating $6a'$, preferably, has a low coefficient of friction relative to the surface of staple 12' in which it is in contact. Coating $6a'$ may be advantageously composed of a very high molecular weight polyethylene film or ethylene polytetrafluoride.

Each link 1', preferably, defines centering pins 13' and cavities 14'. A centering pin 13' of one link 1' is configured to be received within a corresponding cavity 14' of an adjacent link 1'. Centering pin 13' and cavity 14' form a guiding device. Employment of centering pin 13' and cavity 14' as a guiding device does not affect the contact that occurs between interior surfaces 10' of link 1' and oblique walls 5' of loop 2'.

The contact pressure against interior surfaces 10' and oblique walls 5' may vary such that a very rapid variation of stresses within belt 102' may occur during passage of belt 102' from either of straight line trajectory portions 108' and 110' to one of pulleys 104' and 106'. With the present invention, the contact pressure exerted between interior surfaces 10' and oblique walls 5', which remain in generally permanent contact with one another, is continuous. With a conventional V-belt not employing links such as links 1', however, each point of such a belt is only periodically in contact with the flanges of the pulleys.

Since the imaginary original lines, or predicted path of travel of links 1', coincide with the region of the neutral fiber adjacent reinforcement 7', no separation between constituent materials is necessary during operation.

Micro-displacements can occur in the zone of, and between, lateral staples 12' and exterior surface 6'. Such micro-displacements can occur because parallel surfaces 3' pivot away from one another along those portions of belt 102' that are wound around pulleys 104' and 106'. Further, the length of surface 6' increases along those portions of belt 102' that are wound around pulleys 104' and 106' in contrast to those portions of belt 102' that are positioned along straight line trajectory portions 108' and 110'. For this reason, coating or covering $6a'$, which has a low coefficient of friction, is considered necessary to allow for such micro-displacements between staples 12' and surface 6'. However, both surface 6' and coating or covering $6a'$ must retain a degree of deformability that is compatible with the flexing of belt 102'.

Below the neutral fiber, in the zone of the elements that are resistant to transverse compression, the tapered shape of oblique surfaces 4' reduces the contact surface between them and loop 2', to a fraction of the surface of belt 102' which is elastically deformable in flexure.

During the winding of belt 102' around pulleys 104' and 106', adjacent oblique surfaces 4' of adjacent links 1' move, or pivot, toward one another. Such movement, in turn, causes a volumetric compression of the portion of loop 2' that is located between the neutral fiber of reinforcement 7' and small base 9'.

Loop 2' may be a conventional V-belt of standardized dimensions. Such a V-belt may be used for conventional industrial or automobile applications. When such a conventional V-belt is employed as loop 2' such a belt may accept stresses that are significantly higher than the maximum stresses specified when such belts are used for conventional purposes. Therefore, belt 102' may be used in applications requiring much higher mechanical power transfer than possible with conventional belts. Belt 102' may experience surface stresses that are very much higher than those stresses experienced by conventional belts in typical known applications. It has been shown that power transmitted through belt 102' is distributed such that about one-third of the tension within belt 102' is transmitted by V-belt 21' of loop 2'. Two-thirds of the tension within belt 102' is transmitted by and through the reciprocal contact between adjacent links 1'. With belt 102' of the present invention, the stresses in belt 102' are much more evenly distributed due to the compression of, generally, the entire surface area of oblique walls 5' of V-belt 21'.

Also, compressive forces, generally of the same order of magnitude as those applied to oblique walls 5', are exerted in an analogous manner on exterior oblique surfaces 11' of link 1'. Such compressive forces on exterior oblique surfaces 11' cause surfaces 11' to become somewhat flattened by contact with the flanges of the pulleys.

The risks of high alternating stresses in zone E' (shown in FIG. 7), when the magnitude of such stresses are calculated by the finite element method as described in French Publication No. 2625783, are significantly reduced by the present invention due to the utilization by the present invention of loop 2' that is in the form of V-belt 21'. The employment of such a loop 2' by the present invention is why the mechanical power transmitted by belt 102' can be much higher than possible when using conventional belts.

Figure 8A:
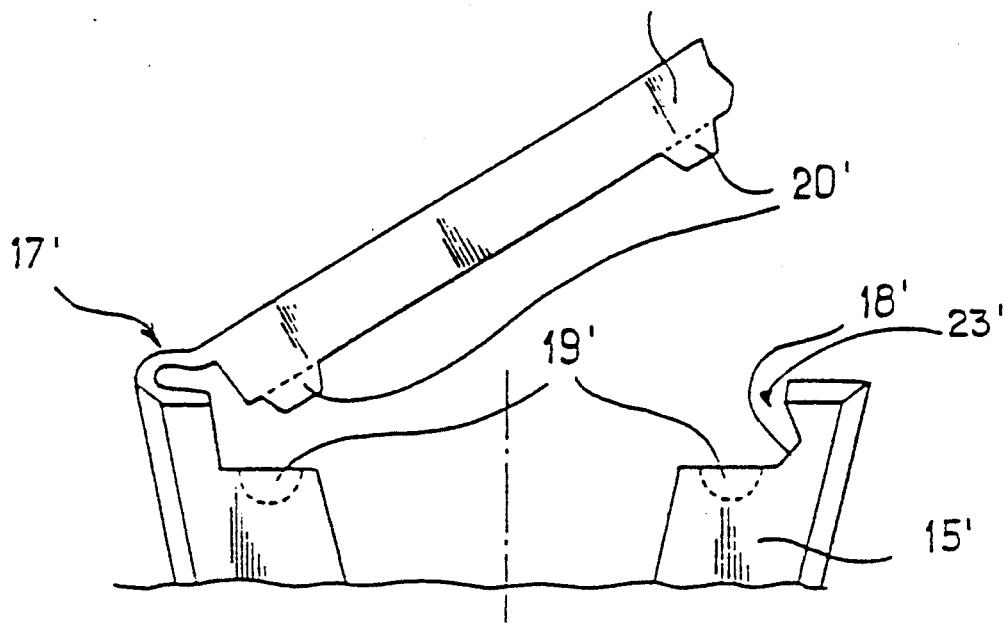
FIG. 8A is a fragmentary front elevational view of a closable link of the present invention.
Figure 8B:
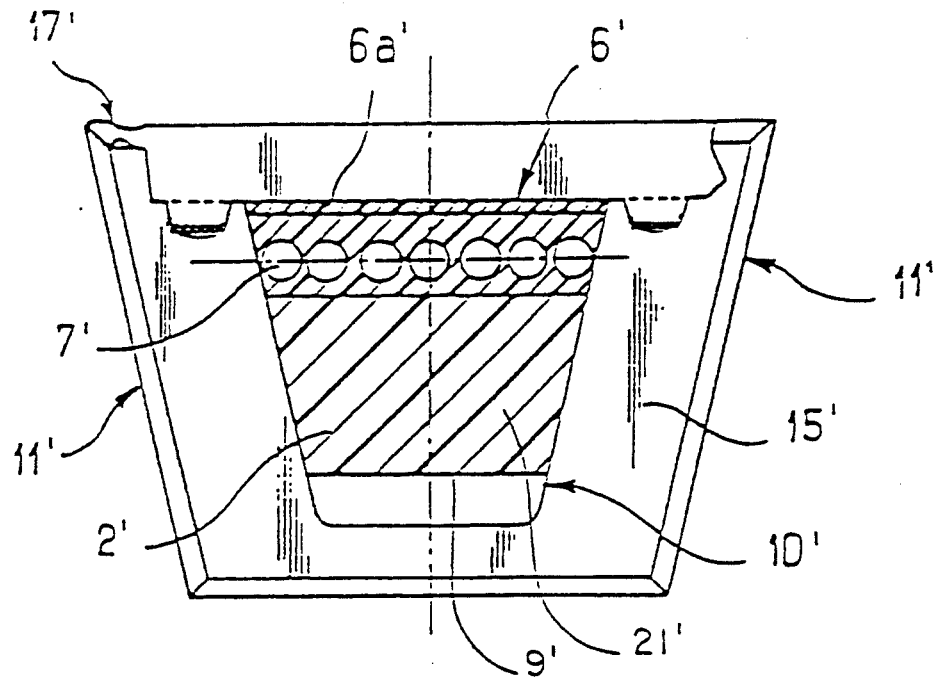
FIG. 8B is a front elevational view, partially in section, an embodiment of the transmission belt of the present invention that employs the closable link shown in FIG. 8A.

FIGS. 8A and 8B show another embodiment of the present invention. Closed, or closable, link 15' further minimizes the risk of alternating fatigue due to stresses within the belt.

Closable link 15' is engaged with loop 2' in a different manner than is link 1'. Closable link 15' is, merely, positioned around a portion of loop 2', when strap 16' is in the open position as shown in FIG. 8A. Link 1', on the other hand, may be engaged or snapped, over loop 2' only by forcing staples 12' over exterior surface 6' of loop 2'. Strap 16' is articulately connected to link 15' by hinge 17'. Hinge 17' permits strap 16' to be closed over loop 2'. FIG. 8A shows closable link 15' with strap 16' opened. FIG. 8B shows link 15' in place on loop 2' with strap 16' closed. Strap 16' is held in the closed position, for example, by notch 23' defined by edge 18'.

Preferably, cavities 19' are formed in the body of closable link 15'. Cavities 19' are configured to receive its corresponding lugs 20' that are on strap 16'. Other arrangements of cavities 19' and lugs 20' are possible. For example, cavities 19' may be formed in strap 16' and lugs 20' may be located on the body of closable link 15'. Also, at least one cavity 19' and at least one lug 20' may each be located on each of strap 16' and lug 20'.

The exterior contour of each of links 1' and 15' is symmetrical once installed on loop 2'. Therefore, link 1' and 15' may be assembled in any desired and functional orientation on loop 2'.

Closable link 15' defines somewhat of a beam that is, under optimum conditions, resistant to compression by virtue of exterior oblique surfaces 11'. Generally, the lower portion of closable link 15' is not as thick as the thickness between the oblique surfaces 11' and interior surfaces 10', on account of the existence of the oblique faces.

Belt 102' may be used in the same applications as would a conventional, wide V-belt. With the employment of belt 102', transverse compression reinforcement is provided by the links 1' and 15' that are positioned external to loop 2'.

A preferred fabrication process for belt 102' includes the initial step of the fabrication of links 1' and/or links 15'. Such fabrication may take place by mass production molding of a composite polymer material that is reinforced with short fibers.

V-belt 21' is, preferably, formed by the superimposition of reinforcement element 7' around a mandrel. Such reinforcement element 7' is preferably embedded in polymer or elastomer compound base 8'. Polymer, or elastomer, compound base 8' is intimately bonded, preferably by physico-chemical, or physio-chemical, adherence to reinforcement element 7'. Reinforcement element 7', preferably, consists of wire or short fibers of high modulus material such as, preferably, textile material. Also, polymer or elastomer compound base 8' is intimately bonded to the compression resistant element which extends downward from the neutral fiber reinforcement adjacent element 7' of loop 2'. The portion of loop 2' that includes the compression resistance elements may be formed by the stacking of layers of cord coated with polymer compound. Also, that portion may be formed by stacking sheets of polymer compound that are reinforced by oriented short fibers. Such reinforcing ensures the transverse rigidity necessary for the V-shaped belt 21' of loop 2'.

A belt covering, comprising a material having a low coefficient of friction such as very high molecular weight polyethylene or ethylene polytetrafluoride may be positioned around the exterior of loop 2'. The covering may be intimately bonded by physico-chemical, or physio-chemical, adherence to large base 24' of loop 2'. Such physico-chemical or physio-chemical, adherence may be performed by vulcanization. An appropriate guide process may be employed to ensure the assembly of either of links 1' or 15' on loop 2'. Such a process may be employed irrespective of whether the walls of loop 2' are covered or bare. In the case of closable links 15', the closing of straps 16' is followed, if necessary, by a continuous heat sealing process along the two lines defined by the plurality of lugs 13' of the closable links 15'. Such sealing may be performed by ultrasound, by a cyanoacrylate adhesive process or any other similar process.

The number of links 1' and/or 15' mounted on loop 2', for a given length of belt 102', is checked to make certain that there is a specified amount of "play", or slack, in belt 102'. Such slack should be within specified maximum and minimum tolerances when belt 102' is disposed about pulleys 104' and 106'. The slack is absorbed when belt 102' winds around pulleys 104' and 106' and when belt 102' assumes a position along straight line trajectory portions 108' and 110'.

Belt 102' operates dry, that is without lubrication. Belt 102' can provide power transmission capabilities in a compact form. Such power transmission capabilities are significantly greater than those capabilities possible if a conventional V-belt alone were employed to transmit the power without the use of links 1' and/or 15'. In fact, belt 102' may provide an increase in power transmission capabilities by a factor of almost three over the power transmission capabilities of conventional V-belts.

The present invention provides the designers of power transmission systems with a high-performance, flexible transmission element that does not require delicate manufacturing and/or installation techniques or the employment of complex new technologies. The present invention employs components whose manufacturing processes are familiar and reliable and which manufacturing processes require only limited tooling irrespective of the lengths of the transmission elements to be fabricated.

In summary, one feature of the invention resides broadly in a flexible power transmission element, for fixed ratio or variable ratio transmission by grooved pulleys, operating by dry adherence, consisting of a loop which is flexible and quasi-inelastic, and equipped with transversally rigid thrust links, characterized by the fact that the endless core 2 is formed by a V-belt with oblique walls 12 in contact with the interior surfaces 14 of the thrust links in the form of stirrups 4 or 20, surrounding said loop 2, and by the fact that said rigid links are covered by a fabric 3 which forms the surface in contact with the cheeks of the transmission pulleys 5 and 6.

Another feature of the invention resides broadly in a flexible power transmission element, characterized by the fact that the loop 2 consists of a V-belt with oblique, enclosed walls 12.

Yet another feature of the invention resides broadly in a flexible power transmission element, characterized by the fact that the endless core 2 consists of a raw-edged V-belt with oblique walls 12.

A further feature of the invention resides broadly in a flexible power transmission element, characterized by the fact that the loop 2 is provided over its large base 17 with a coating having a low coefficient of friction 18. On this the stirrup-shaped links 4 or 20 rest during the straight-line trajectory in the slack side.

A yet further feature of the invention resides broadly in a flexible power transmission element, characterized by the fact that the covering fabric 3 covers all of the exterior surfaces of the thrust links in the form of stirrups 4 or 20.

Yet another further feature of the invention resides broadly in a flexible power transmission element, characterized by the fact that the covering fabric 3 is arranged in multiple layers on the exterior surface of the thrust links in the form of stirrups 4 or 20.

An additional feature of the invention resides broadly in a flexible power transmission element, characterized by the fact that the covering fabric 3 is attached by adhesive to the exterior oblique surfaces 26 of the thrust links in the form of stirrups 4 or 20.

A yet additional feature of the invention resides broadly in a flexible power transmission element, characterized by the fact that the covering fabric 3 is also applied by adhesive along a bevel 11 which follows each of the peaks of the thrust links in the shape of stirrups 4 or 20.

A further additional feature of the invention resides broadly in a flexible power transmission element, characterized by the fact that each of the thrust links consists of a rigid stirrup 4, covered with the fabric 3 closed on itself by overlapping its ends over the coating having a low coefficient of friction 18 on the large base 17 of the endless core 2 and to which it is not bonded.

A yet further additional feature of the invention resides broadly in a flexible power transmission element, characterized by the fact that each of the thrust links consists of a closed stirrup 20, including a strap 21 which encloses the endless core 2 by the engagement of matching lugs 25 and cavities 24.

Another further additional feature of the invention resides broadly in a flexible power transmission element, characterized by the fact that the definitive closing of each closed stirrup 20 is ensured by heat sealing or gluing of the matching lugs 25 in the cavities 24.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicants' option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A power transmission belt for a transmission, said transmission having a drive pulley and a driven pulley, said transmission belt for extending movably around said drive pulley and said driven pulley, said drive pulley for driving said driven pulley by said transmission belt, said belt comprising:

a flexible loop of material;
   said flexible loop having a substantially trapezoidal cross section;
   a plurality of substantially rigid links mounted on s aid flexible loop;
   said links each defining a cavity for receiving a portion of said flexible loop, said cavity being configured to correspond substantially to a portion of said flexible loop cross section;
   said links each having an exterior perimeter surface defining an at least partially trapezoidal cross section;
   each said link having opposed contact surfaces connected to said exterior perimeter surface;
   each said link contact surface for being in removable contact with an adjacent said contact surface of an adjacent said link;
   each said link contact surface being configured to push said adjacent contact surface of said adjacent link to move said belt along the path of travel;
   a flexible cover substantially surrounding said exterior perimeter surface of each said link;
   said flexible cover extending generally continuously along generally the entire length of said belt;
   said flexible cover comprises a fabric;
   further including reinforcement means for reinforcing said flexible loop;
   said links define an opening extending from said exterior perimeter surface to said cavity;
   further including staple means for attaching said links to said flexible loop;
   at least one said contact surface of each said link defines two diverging walls;
   said exterior perimeter surface of each said links defines at least one bevel;
   said staple means is in contact with said flexible loop;
   said flexible loop includes a coating in contact with said staple means;
   said coating provides a low coefficient of friction between said flexible loop and said staple means such that said staple means and said flexible loop are relatively slideable with one another when said transmission belt moves around said drive pulley and said driven pulley;
   further including strap means for covering each said opening of each said link;
   wherein said strap means includes hinge means for movably connecting said strap means to said links.

2. The transmission belt of claim 1, wherein:

said strap means includes hinge means for movable connecting said strap means to said links;
   said strap means includes lock means for locking said strap means to said links;

said flexible cover includes overlapping cover portions adjacent said strap means;
said flexible loop and each said link define a hole therebetween;
said flexible cover is attached to said links by an adhesive;
said flexible cover comprises at least one layer of fabric;
said adhesive is applied to said links in the vicinity of said bevel;
said links are transversely rigid;
said lock means comprises a lug and a corresponding recess;
each said strap means is connected to each said link by at least one of: a) a heat seal, and b) glue;
said flexible loop is quasi-inelastic;
said pulleys are in contact with said flexible cover by dry adherence;
said flexible loop is substantially a V-belt; and
said links are substantially in the form of stirrups.

3. A transmission arrangement comprising:
a drive pulley;
a driven pulley;
each of said drive pulley and said driven pulley having conical surfaces and a center of rotation;
a transmission mechanism extending around each of said drive pulley and said driven pulley;
said transmission mechanism including at least one endless flexible connecting element;
said transmission mechanism including a plurality of links mounted on said endless flexible connecting element;
each of said links including at least one groove means for receipt of said endless flexible connecting element therein;
said links defining a cross section;
said cross section having a generally trapezoidal shape, said cross section having an outer dimension and an inner dimension;
said inner dimension being generally parallel to said outer dimensions;
said inner dimension being smaller than said outer dimension;
said inner dimension being disposed closer to the center of rotation of the pulleys than the outer dimension;
said links defining an opening extending from the outer dimension of said links to said link groove means;
means for covering said link opening;
said means for covering said opening comprising strap means for covering said link opening; and
said strap means including hinge means for movably connecting said strap means to said links.

4. The transmission arrangement of claim 3, wherein:
said strap means includes lock means for locking said strap means to said links;
said links are transversely rigid; and
each said strap means is connected to each said link by at least one of: a) a heat seal, and b) glue.

5. The transmission arrangement of claim 4, wherein said opening is closed by said strap means, said links and said strap means, surround said endless connecting element.

6. The transmission arrangement of claim 5, wherein said lock means comprise lugs and cavities;
said strap means and said links comprise said lugs and said cavities, said cavities for receiving said lugs to lock said strap means in said lugs.

7. The transmission arrangement of claim 6, wherein said lugs comprise one of:
round lugs and flat topped lugs.

8. The transmission arrangement of claim 7, wherein said endless flexible connecting element defines a generally trapezoidal cross section.

9. The transmission arrangement of claim 8, wherein said link groove means is configured to correspond substantially to a portion of said endless flexible connecting element cross section.

10. The transmission arrangement of claim 9, further including reinforcement means for reinforcing said endless flexible connecting element.

11. The transmission arrangement of claim 10, wherein said links define an opening extending from a perimeter surface of said links to said link groove means.

12. The transmission arrangement of claim 11, wherein said links define a generally trapezoidal interior cross section.

13. The transmission arrangement of claim 12, further including staple means for attaching said links to said flexible loop.

14. The transmission arrangement of claim 13, wherein:
said flexible loop is quasi-inelastic;
said pulleys are in contact with said flexible cover by dry adherence;
said flexible loop is substantially a V-belt;
said links are substantially in the form of stirrups;
at least one said contact surface of each said link defines two diverging walls;
said exterior perimeter surface of each said link defines at least one bevel;
said staple means is in contact with said flexible loop;
said flexible loop includes a coating in contact with said staple means; and
said coating provides a low coefficient of friction between said flexible loop and said staple means such that said staple means and said flexible loop are relatively slideable with one another when said transmission belt moves around said drive pulley and said driven pulley; and
each said exterior perimeter surface on each of said links comprising a first side portion and a second side portion, said first and second side portions being configured for transmitting mechanical power to said driven pulley and receiving mechanical power from said drive pulley.

15. A power transmission belt for a transmission having a drive pulley and a driven pulley, said transmission belt for extending movably around said drive pulley and said driven pulley and for being driven by said drive pulley, said belt comprising:
a flexible loop of material in the form of a endless flexible connecting element;
a plurality of substantially rigid links mounted on said flexible loop;
said links each defining a cavity for receiving a portion of said flexible loop, said cavity being configured to correspond substantially to a portion of said flexible loop cross section;
said links each having an exterior perimeter surface defining an at least partially trapezoidal cross section;

each said link having opposed contact surfaces connected to said exterior perimeter surface;

each said link contact surface for being in removable contact with an adjacent said contact surface of an adjacent said link;

each said link contact surface being configured to push said adjacent contact surface of said adjacent link to move said belt, along the path of travel;

said links having at least one groove means for receipt of said flexible loop therein;

said cross section having an outer dimension and an inner dimension;

said inner dimension being generally parallel to said outer dimension;

said inner dimension being smaller than said outer dimension;

said inner dimension for being disposed closer to the center of rotation of the pulleys then the outer dimension;

said links defining an opening extending from the other dimension of said links to said link groove means;

means for covering said link openings;

said means for covering said openings comprising strap means for covering said link openings; and said strap means including hinge means for movably connecting said strap means to said links.

16. The belt of claim 15 wherein said strap means includes lock means for locking said strap means to said links;

said links being transversely rigid; and each said strap means is connected to each said link by at least one of: a) a heat seal, and b) glue.

17. The belt of claim 16, wherein said opening is closed by said strap means, said links and said strap means, surround said endless connecting element;

said lock means comprise lugs and cavities;

said strap means and said links comprises said lugs and said cavities, said cavities for receiving said lugs to lock said strap means in said links;

said lugs comprise on of:

round lugs and flat topped lugs;

said endless flexible connecting element defines a generally trapezoidal cross section;

said link groove means is configured to correspond substantially to a portion of said flexible element cross section;

reinforcement means for reinforcing said flexible element;

said inks define an opening extending from a perimeter surface of said links to said link groove means;

said links define a generally trapezoidal interior cross section; and including staple means for attaching said links to said flexible loop.

18. The belt of claim 17, wherein:

said flexible loop is quasi-inelastic;

said pulleys are in contact with said flexible cover by dry adherence;

said flexible loop is substantially a V-belt;

said links are substantially in the form of stirrups;

at least one said contact surface of each said link defines two diverging walls;

said exterior perimeter surface of each said link defines at least one bevel;

said staple means is in contact with said flexible loop;

said flexible loop includes a coating in contact with said staple means;

said coating provides a low coefficient of friction between said flexible loop and said stale means such that said staple means and said flexible loop are relatively slideable with one another when said transmission belt moves around said drive pulley and said driven pulley; and each said exterior perimeter surface on each of said links comprising a first side portion and a second side portion, said first and second side portions being configured for transmitting mechanical power to said driven pulley and receiving mechanical power from said drive pulley.

* * * * *

UNITED STATES PATENT AND TRADEMARK OFFICE
CERTIFICATE OF CORRECTION

PATENT NO. : 5,242,332
DATED : September 7, 1993
INVENTOR(S) : Louis DOUHAIRET, Daniel PLAY and Roger TRINQUARD It is certified that error appears in the above-indentified patent and that said Letters Patent is hereby corrected as shown below:

In column 11, line 5, after 'belt', insert --1--.

In column 18, line 49, Claim 1, after the second occurrence of 'said', delete "links" and insert --link--.

In column 19, line 42, Claim 3, after 'outer', delete "dimensions" and insert --dimension--.

In column 21, line 18, Claim 15, after 'pulleys', delete "then" and insert --than--.

In column 22, line 1, Claim 17, after 'comprise', delete "on" and insert --one--.

In column 22, line 10, Claim 17, after 'said', delete "inks" and insert --links--.

In column 22, line 30, Claim 18, after the second occurrence of 'said', delete "stale" and insert --staple--.

Signed and Sealed this

Nineteenth Day of July, 1994

Attest:

BRUCE LEHMAN

*Attesting Officer*    *Commissioner of Patents and Trademarks*